Figure 1:
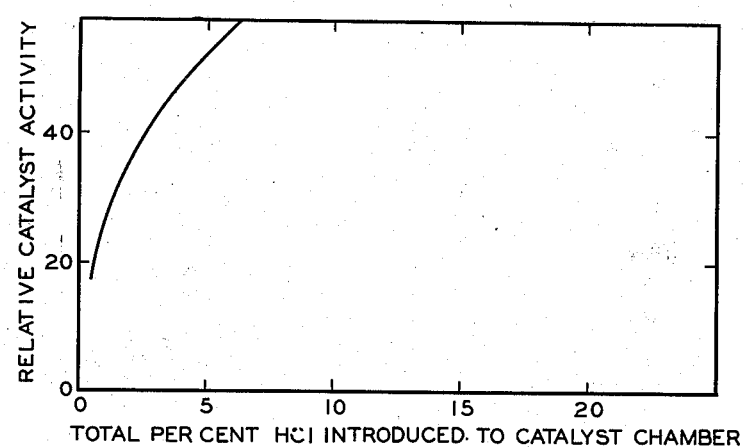

April 8, 1952  J. W. LOY  2,591,843
CATALYTIC ISOMERIZATION OF HYDROCARBONS
Filed Oct. 20, 1947  2 SHEETS—SHEET 1

INVENTOR.
J. W. LOY
BY Hudson & Young
ATTORNEYS

April 8, 1952        J. W. LOY        2,591,843

CATALYTIC ISOMERIZATION OF HYDROCARBONS

Filed Oct. 20, 1947        2 SHEETS—SHEET 2

INVENTOR.
J. W. LOY

BY Hudson & Young

ATTORNEYS

Patented Apr. 8, 1952

2,591,843

UNITED STATES PATENT OFFICE 2,591,843

CATALYTIC ISOMERIZATION OF HYDROCARBONS

John W. Loy, Woods Cross, Utah, assignor to Phillips Petroleum Company, a corporation of Delaware Application October 20, 1947, Serial No. 780,843

6 Claims. (Cl. 260—683.5)

This invention relates to an isomerization process. In one of its more specific aspects it relates to an improved method for the introduction of a reaction promoting agent to the catalyst bed of a vapor phase isomerization system.

One of the more commonly used processes of catalytic isomerization involves the use of a carrier, generally a commercial form of bauxite, called "Porocel," impregnated with aluminum chloride as a catalyst. The impregnation takes place within the catalyst chamber after the carrier has been changed, by means of sublimation. The aluminum chloride is sublimed in such a manner, that the ratio of aluminum chloride to carrier decreases in the direction of the flow of gases through the catalyst chamber.

A second process is also in use in which the catalyst is prepared outside the catalyst chamber in such a manner, that it provides a uniform deposit of aluminum chloride on the carrier. The treated carrier is then charged to the catalyst chamber.

In commercial operation of each of these processes, all of the catalyst activator (hydrogen chloride) is introduced in the feed stream. In the first process, when the catalyst becomes sufficiently spent, new aluminum chloride is sublimed onto the bauxite. In the second process, when the catalyst becomes spent, the complete catalyst bed is removed and a new change of prepared catalyst is introduced. In each of the two processes described, migration of aluminum chloride through the catalyst bed will take place during the isomerization cycle, and is related to space velocity, temperature, and concentration. However, in the first process this is not a disadvantage. In the second process it is a disadvantage. Because of the higher concentration of aluminum chloride at the top of the catalyst bed at the beginning of the cycle in the second process, the aluminum chloride tends to migrate out of the catalyst chamber and into hydrocarbon recovery equipment.

I have observed that a major difficulty commonly occurring in the two processes described above, as well as in others, is a coking or plugging and/or general premature deactivation of the catalyst bed. Such effects cause shutting down of the isomerization system, costly loss of production, and entail abnormally high operating expense. This difficulty is frequently blamed on the presence in the hydrocarbon feed of some impurities, detectable or undetectable. If the catalyst bed has been in successful use for some time prior to the occurrence of sudden damage, the trouble may rightly be attributed to the inadvertent introduction of impurities or "poisons" in the feed. In other cases, however, deactivation and/or plugging may occur in the positive absence of significant amounts of detrimental agents, more frequently just after catalyst change or sublimation. Such a condition is very evidently the result of too high a rate of conversion, and it is such a case as this to which my invention pertains more particularly; however, it also pertains to "poisoning" of a catalyst bed by the introduction of impurities in the feed stock.

Since, in the case of plugging and/or deactivation immediately after catalyst change, it has been found that the absence of hydrogen chloride completely eliminates such "poisoning," the condition is a result of the manner in which the promoting agent is introduced, rather than from any initially highly active state of the catalyst. It is the usual practice to introduce the entire amount of hydrogen chloride used, at the entrance of the catalyst bed, along with, or in close proximity to, the hydrocarbon feed. Therefore, at the beginning of the process cycle, and immediately after catalyst renewal or sublimation, the obvious thought, at first, is to admit hydrogen chloride in relatively small percentages and thus avoid super-normal catalyst activity, caused by the excess of promoting agent. This is not entirely adequate, however, for the following reasons.

First, the isomerization reaction is influenced by the thermodynamic equilibrium concentrations of reactant and product, chiefly as a function of temperature. For example, the equilibrium concentrations of iso- and normal butane at usual process conditions are from 65 to 72 per cent, and from 35 to 28 per cent respectively. Actual equilibrium can seldom be reached in commercial practice because, if the temperature in the catalyst chamber is raised to the point where maximum conversion will take place, there will be an undue amount of side reactions, causing coking, plugging, and/or deactivation of the catalyst bed. As a result of the above, as well as the introduction of all the hydrogen chloride at the inlet point, a major part of the isomerization reaction, that is, conversion through the catalyst chamber, occurs in a small section of the catalyst bed. In cases where the reaction involves thermal effects, the concentration of catalyst activity in one zone has been actually illustrated by the nature of the temperature gradient through the catalyst bed.

To maintain high production from given facilities, some minimum conversion level is maintained, and by endeavoring to maintain high net conversion, invariably the percentage of hydrogen chloride introduced is increased at an early stage in the process cycle, thus aggravating a localized conversion condition. Also, in one process, a relatively high proportion of aluminum chloride tends to be concentrated in the first part of the catalyst bed at the start of a process cycle which aggravates the situation. It is somewhat of a corollary that unduly rapid depletion of catalyst activity goes hand-in-hand with initially high activity. Further, the tolerance of the catalyst with respect to feed impurities is decreased in the zone of abnormally high activity.

Second, there are some practical considerations, influencing the problem, which are based on the physical mechanism of diffusion in catalytic conversion. It has not been generally appreciated, that the effective instantaneous rate of conversion at a prescribed point in a catalytic conversion zone has important bearing on general efficiency of the process concerned. For a more clear understanding, assume an isolated catalyst particle in a stream of hydrocarbon. Through the process of diffusion, "X" units of the process stream are sorbed and desorbed from the catalyst per unit time. "X" units of the main stream compose some increment which in itself may undergo relatively high conversion; high enough, for example, to cause unwanted side reactions, reduce the efficiency of the isomerization step, and rapidly deactivate the catalyst particle. Regardless of the potential degree of activity of the catalyst, it may be controlled entirely by the concentration of promoting agent present. The overall net conversion shown by an analysis of the effluent stream gives no indication of reaction intrinsic to the catalyst particle itself, or expanding this idea, does not reveal localized peak activity within the catalyst bed. As previously stated, this may only be determined by the temperature gradient through the catalyst bed.

Broadly speaking, my invention comprises a process of improving catalytic isomerization of hydrocarbons by introducing the promoting agent to the catalyst zone multipointwise, flowwise, and in controlled variable volume.

In accordance with this invention, hydrocarbons are isomerized without the usual fouling of the catalyst such as coking, deactivation, and/or plugging, which usually accompanies such operations. One of the advantages of this invention is that full use is made of the catalyst bed in the process of isomerization, by keeping all of it active rather than having localized activity in various zones.

An object of the present invention is to provide a novel and improved method for catalytic isomerization of hydrocarbons.

Another object of this invention is to effect efficient conversion of normal butane to isobutane.

Another object is to obtain uniform net conversion through a whole isomerization catalyst bed.

A further object is to prolong the life of a catalyst bed.

Further objects and advantages of this invention are apparent from this specification, drawing and claims.

A better understanding of my invention may be had by referring to the accompanying diagrams. Figure 1 attached, indicates the relative catalyst activity in relation to the total per cent of hydrogen chloride introduced to a catalyst chamber. As is shown, after the percentage of hydrogen chloride goes above about 5 the relative catalyst activity increases less rapidly, thus no great advantage is obtained by increasing the per cent of promoting agent very far above 5 mol per cent of the feed.

Figure 2:
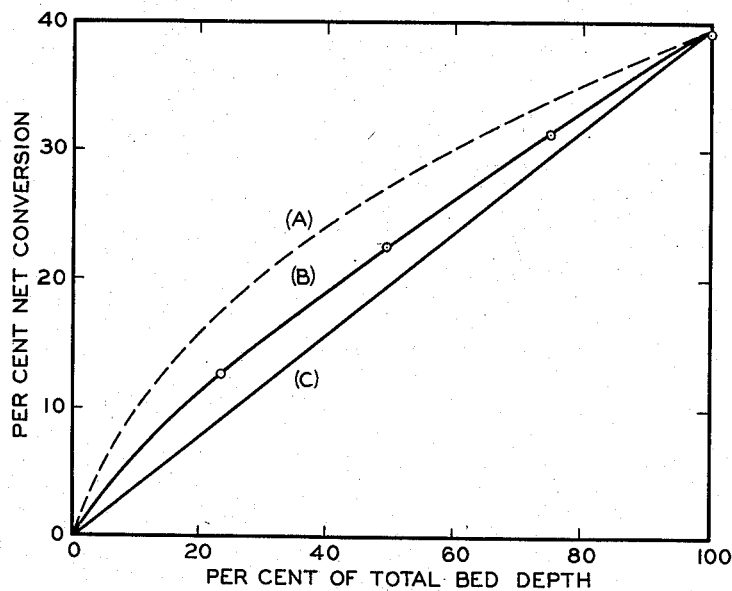

Figure 2 attached, shows the per cent net conversion of the feed stock in relation to the catalyst bed depth. Curve (a) represents conversion as obtained in the isomerization process first described, in which the carrier is charged to the catalyst chamber and then aluminum chloride is deposited on it by means of sublimation, and in which all the promoting agent is introduced with the feed. As may clearly be seen from the slope of the curve, the highest conversion takes place in the portion of the catalyst bed nearest the point of introduction of the feed vapor. Because of this, the catalyst is more apt to become poisoned, coked up and/or deactivated rapidly, reducing the possible length of the isomerization cycle and making necessary frequent catalyst change.

Curve (b) of Figure 2 represents the conversion obtained by the second process described, in which the aluminum chloride is deposited on the carrier outside the catalyst chamber, and in which all the promoting agent is introduced with the feed. This method gives a uniform concentration of aluminum chloride throughout the whole catalyst bed. As shown by curve (b), the per cent net conversion throughout the catalyst bed does not vary as much as that described by curve (a). However, this method also has a highly active zone in the lower portion of the catalyst bed. Because of this the catalyst is overworked and depleted at an uneconomic rate.

Employement of my invention causes the operating line to approach very closely that of curve (c), Figure 2, in which the per cent net conversion remains the same through the catalyst bed. Such conversion is possible because of the method in which the isomerization reaction promoting agent is introduced to the catalyst bed.

Figure 3:
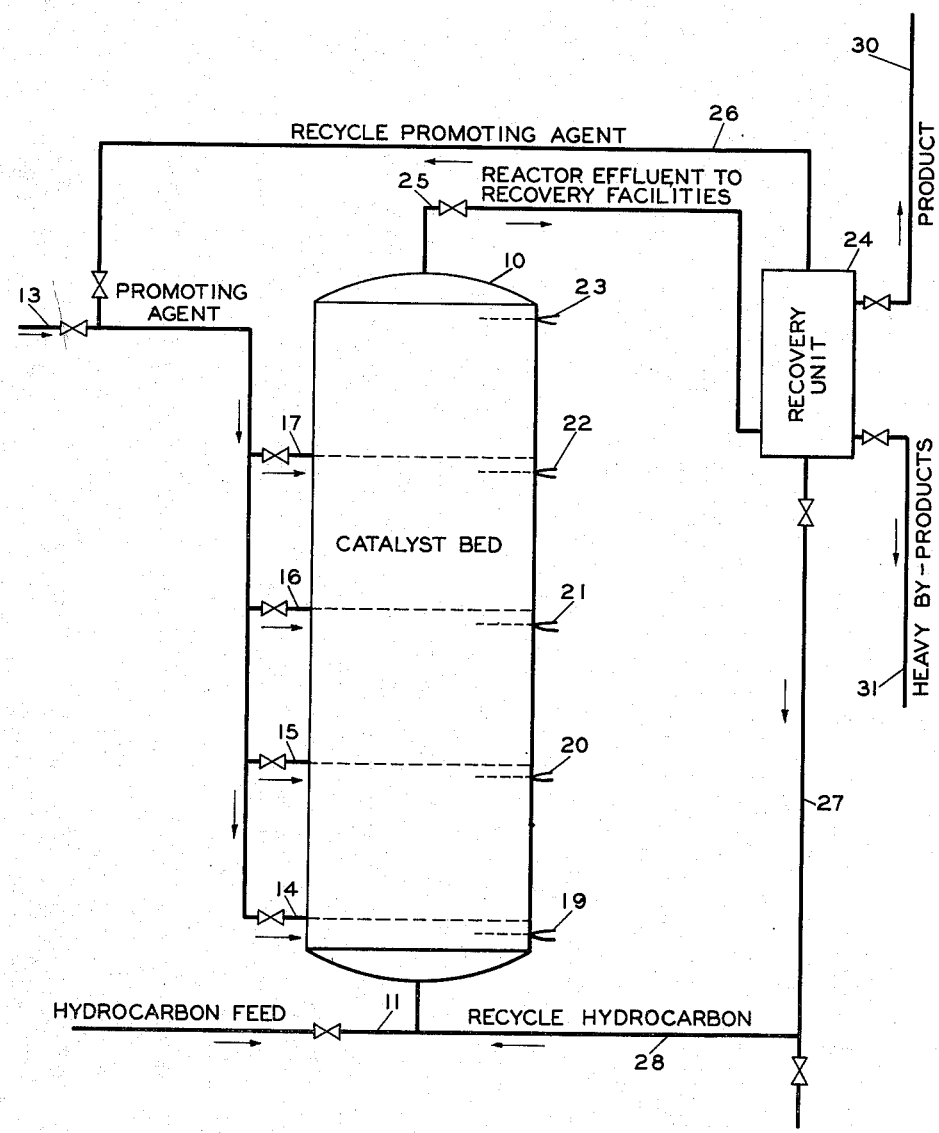

Referring now to Figure 3, which is a schematic flow diagram, hydrocarbon feed, such as normal butane, is introduced to catalyst chamber 10, which contains a suitable isomerization catalyst such as aluminum chloride deposited on bauxite, through line 11. A suitable isomerization promoting agent, such as hydrogen chloride, is introduced to catalyst chamber 10 multipointwise, flowwise and in controlled variable volume through lines 13, 14, 15, 16, and 17. More or less points of injection for the promoting agent may be used as desired, however, four is the recommended number. In any case, the first injection point should be either through the same line as the hydrocarbon feed or in close proximity to it, as in the bottom of the catalyst bed. All the points of injection should be spaced equidistant from each other, starting at the bottom of the catalyst bed, and dividing the catalyst bed into equal parts. Thermocouples 19, 20, 21, and 22 are installed slightly below the inlets for the promoting agent, and thermocouple 23 is installed just below the outlet of the chamber, so that a careful check of the catalyst bed temperatures may be had. The reaction effluent is removed from catalyst chamber 10 through line 25 to recovery unit 24 where it is seperated. The promoting agent is removed from unit 24 through line 26 and recycled to catalyst chamber 10. Untreated hydrocarbon is removed from recovery unit 24 through line 31 along with heavy by-products of the process, and/or recycled to catalyst chamber 10 through lines 27, 28, and 11. The product gas is removed from recovery unit 24 through line 30 as a product of the process.

The following is given as an example of this process. In the operation of this invention, immediately after a fresh sublimation of aluminum chloride onto a bauxite carrier, by introduction of a stream of butane and aluminum chloride through line 11, only a very small amount of hydrogen chloride, about 0.1 to about 1.0 mol per cent of the feed, is continuously admitted to lower inlet 14, located at the bottom of the catalyst bed. An additional amount of promoting agent from about 0.5 to about 2.5 mol per cent of the feed is introduced at inlet 15 located one-quarter of the way up the catalyst bed, hydrogen chloride in the amount of about 1.5 to about 4.5 mol per cent of the feed is introduced through inlet 16, located one-half the way up the catalyst bed, and hydrogen chloride in the amount of about 2.0 to about 7.0 mol per cent of feed is introduced through inlet 17, located three-quarters of the way up the catalyst bed. As the isomerization cycle progresses, and the aluminum chloride migrates up through the bed of carrier, more of the promoting agent is introduced toward the bottom of the catalyst bed, with a decrease in the amount of hydrogen chloride introduced in the region of increasing concentration of aluminum chloride, until near the end of the cycle all or nearly all the promoting agent is being introduced through the bottom inlet. The amount of hydrogen chloride introduced through each of the various inlets at any one time is controlled in such a manner that the rate of conversion throughout the catalyst bed is substantially uniform, not exceeding about 10 to about 12 per cent of the feed stock in any quarter of the catalyst bed. With a single, large catalyst bed, such as is illustrated in Figure 3, the amount of conversion between any two points is directly indicated by the temperature rise of the stream as it passes from one point to the other, since the conversion of normal butane to isobutane is exothermic. Therefore, in this instance, the amount of hydrogen chloride through each of lines 14, 15, 16, and 17 is varied during the conversion cycle to maintain a uniform temperature gradient from the inlet to the outlet of the catalyst bed. The temperature at the inlet of the catalyst chamber is maintained at about 230 to about 290° F., gradually being increased as the conversion cycle continues, and at the outlet of the chamber, so that it does not exceed the inlet temperature by more than about 50° F., and does not go above about 315° F. The operating pressure is about 215 to about 280 pounds per square inch at the gauge.

Under conditions of different hydrocarbon feed and/or different catalyst and promoter, the temperatures, pressures, and other controlled conditions may have to be varied in a manner known to those skilled in the art. While the invention has been described with particular reference to the conversion of normal butane to isobutane in the presence of aluminum chloride, it is understood that this has been primarily by way of example. The invention can also be practiced to advantage when other volatile metal halides are used as an isomerization catalyst, or with any one of a number of adsorptive carriers, and to effect vapor phase isomerization of any one of a number of isomerizable hydrocarbons, such as pentane, a hexane, or a low-boiling cyclo-paraffin.

The advantages of this invention over the known processes are prolonging the life of the catalyst bed, thus permitting more gas to be converted per isomerization cycle, and economy of operation.

Although the process has been described and exemplified in terms of its preferred modifications, it is understood that various changes may be made without departing from the spirit of the process as disclosed and expressed in the claims.

I claim:

1. In a process for isomerization which comprises passing a mixture of isomerizable hydrocarbon and promoting agent under isomerization conditions into one end of an isomerization zone containing a porous catalyst bed, comprising a porous catalyst support upon which has been deposited an isomerization catalyst, and in which the catalyst tends to migrate during the isomerization in the direction of flow of said mixture and wherein isomerized product is removed at the other end of said zone, the improvement which comprises introducing the promoting agent at a plurality of points in the direction of flow of reactants through said bed and in varying controlled quantities, determined in respect of the catalyst activity at each of said points, further varying the quantity of promoter introduced at each of said points during the isomerization by reducing, as said catalyst migrates toward said other end of said zone, the quantities of promoting agent being introduced at points near said other end, while increasing the quantities of promoting agent introduced at said one end of said zone, until near the end of the isomerization substantially all of the promoter is introduced into the said one end of said zone, thereby controlling the injection of said promoting agent in a manner such that the rate of conversion throughout the catalyst bed remains substantially the same.

2. In a process for isomerization which comprises passing a mixture of isomerizable hydrocarbon and promoting agent under isomerization conditions into one end of an isomerization zone containing a porous catalyst bed, comprising a porous catalyst support upon which has been deposited aluminum chloride, and in which the aluminum chloride tends to migrate during the isomerization in the direction of flow of said mixture and wherein isomerized product is removed at the other end of said zone, the improvement which comprises introducing the promoting agent at a plurality of points in the direction of flow of reactants through said bed and in varying controlled quantities, determined in respect of the catalyst activity at each of said points, further varying the quantity of promoter introduced at each of said points during the isomerization by reducing, as said aluminum chloride migrates toward said other end of said zone, the quantities of promoting agent being introduced at points near said other end, while increasing the quantities of promoting agent introduced at said one end of said zone, until near the end of the isomerization substantially all of the promoter is introduced into the said one end of said zone, thereby controlling the injection of said promoting agent in a manner such that the rate of conversion throughout the catalyst bed remains substantially the same.

3. In a process for vapor phase isomerization of a butane to an isomeric butane which comprises passing a gaseous mixture of a butane at a temperature sufficient to maintain it in vapor phase and hydrogen chloride under isomerization conditions into one end of an isomerization zone containing a porous catalyst bed, comprising a porous catalyst support upon which has been deposited an aluminum chloride with an initially decreasing ratio of aluminum chloride to support in the direction of flow of said gaseous mixture, and in which the aluminum chloride tends to migrate during the isomerization in the direction of flow of said mixture and wherein isomerized product is removed at the other end of said zone, the improvement which comprises introducing the hydrogen chloride also at a plurality of points in the direction of flow of reactants through said bed and in varying controlled quantities, determined in respect of the catalyst activity at each of said points, further varying the quantity of promoter introduced at each of said points during the isomerization by reducing, as said aluminum chloride migrates toward said other end of said zone, the quantities of hydrogen chloride being introduced at points near said other end, while increasing the quantities of hydrogen chloride introduced at said one end of said zone, until near the end of the isomerization substantially all of the hydrogen chloride is introduced into the said one end of said zone, thereby controlling the injection of said hydrogen chloride in a manner to maintain a uniform temperature gradient across the catalyst bed.

4. The process of claim 3 wherein the hydrogen chloride is introduced at a sufficient number of points and varied in the amount introduced at each point so that the rate of conversion remains substantially the same throughout the bed, does not exceed about 10 to about 12 per cent of the feed stock in any quarter of the bed and so that the temperature at the outlet of the catalyst chamber does not exceed about 315° F. and varying the introduction of hydrogen chloride at each of said points to maintain a uniform temperature gradient along the length of said catalyst bed.

5. In the process as described in claim 4, the improvement which comprises introducing all the normal butane at the bottom of said catalyst bed within the temperature range of about 230 to about 290° F., and at a pressure of about 215 to about 280 pounds per square inch gauge.

6. In the process as described in claim 4, the improvement which comprises introducing the hydrogen chloride in four streams in moles per cent, as follows: 0.1 to about 1.0; 0.5 to about 2.5; 1.5 to about 4.5 and 2.0 to about 7.0, respectively, at four points along the line and in the direction of flow of the said gaseous mixture.

JOHN W. LOY.

REFERENCES CITED

The following references are of record in the file of this patent:

UNITED STATES PATENTS

| Number | Name | Date |
| --- | --- | --- |
| 2,355,198 | Atwell | Aug. 8, 1944 |
| 2,367,333 | Callaway et al. | Jan. 16, 1945 |
| 2,429,125 | Gerbes | Oct. 14, 1947 |
| 2,439,301 | Hudson et al. | Apr. 6, 1948 |